United States Patent [19]

Poli

[11] 4,174,519

[45] Nov. 13, 1979

[54] METHOD FOR THE IMPROVED UTILIZATION OF RESPONSE SIGNALS IN A SECONDARY RADAR SYSTEM AND A SECONDARY RADAR SYSTEM FOR IMPLEMENTING THE METHOD

[75] Inventor: Pierre R. Poli, Issy les Moulineaux, France

[73] Assignee: Electronique Marcel Dassault, Paris, France

[21] Appl. No.: 953,343

[22] Filed: Oct. 23, 1978

[30] Foreign Application Priority Data

Oct. 26, 1977 [FR] France ................................ 77 32313

[51] Int. Cl.² .............................................. G01S 9/56
[52] U.S. Cl. .................................... 343/6.5 R; 343/7.5
[58] Field of Search ................ 343/6.5 R, 6.5 LC, 7.5

[56] References Cited

U.S. PATENT DOCUMENTS 3,975,730   8/1976   Maeda et al. ........................ 343/6 R Primary Examiner—T. H. Tubbesing
Attorney, Agent, or Firm—Kenyon & Kenyon

[57] ABSTRACT

The time interval between the pulses of an interrogation signals transmitted to aircraft in the vicinity of an airport is varied at will in accordance with air traffic conditions. The time interval under heavy traffic conditions may be varied from its nominal value as a function of the rate of response signals, the garbling rate thereof, or the decoding rate. The time interval may be controlled manually as a function of air traffic conditions displayed on a screen associated with the interrogator and receiver. By varying the time interval the percentage of responses to interrogation may be varied to optimize overall reception conditions and utilization of potentially available information.

13 Claims, 3 Drawing Figures

METHOD FOR THE IMPROVED UTILIZATION OF RESPONSE SIGNALS IN A SECONDARY RADAR SYSTEM AND A SECONDARY RADAR SYSTEM FOR IMPLEMENTING THE METHOD

The invention relates to a method for the improved utilization of response signals transmitted from aircraft and received at a ground-based secondary radar station, and a radar system implementing the method.

Most radar equipped airports are provided with both a radar system for locating aircraft in the vicinity of the airport, known as primary radar, and a secondary radar which scans the sky and interrogates the aircraft. The reception of interrogation signals aboard the aircraft triggers an airborne responder which transmits a response radar signal to each interrogation signal which is then decoded upon reception at the airport and furnishes requisite information.

Customarily, the ground-based secondary radar station is designed to operate according to several modes as a function of which the responder provides information of a particular type, most often aircraft identification number or a flight pattern number in an interrogation mode called mode A, and the altitude in an interrogation mode called mode C, etc.

Such radar intercommunications between an airport or airfield secondary radar station and approaching aircraft has given satisfactory results as long as there are not too many aircraft in the vicinity of the airport. But as air traffic has increased, the number of aircraft has increased greatly, especially at certain times of the day, with attendant difficulties to process the information emanating from each of the aircraft being interrogated.

Airborne responders are all tuned at the same wavelength and despite the shortness of the response signals from the various aircraft it is not unusual that upon reception at the airfield it is not possible to separate response signals emanating from different aircraft.

This difficulty is so much greater as:
(1) the main lobe corresponding to the interrogating radar transmission, although defining a very small solid angle, may at any given time be directed at several different aircraft;
(2) several aircraft may be at substantially the same distance from the airfield at any given moment; and
(3) it is desired to be able to make available at the airfield receiver a multiplicity of messages from an aircraft to derive the sought-after information.

In fact, an overlapping of in-coming signals simultaneously received from two or more aircraft may occur upon reception at the airfield, and this phenomenon, which is commonly known as garbling, requires the installation of so-called "degarbling" means for the airfield receiver in an attempt to particularize the signals received and unequivocally correlate them with the aircraft from which they were transmitted.

Sometimes, in addition to the garbling there is a phenomenon known as "fruit" which originates in the reception at a particular airfield of signals transmitted by airborne responders in response to interrogations from another airfield interrogator, as the airborne responders transmit omnidirectionally.

For some time, in spite of the operation of "degarbling" means for airfield receivers and also "defruiting" means, the identification of aircraft at certain times of the day becomes difficult and long in resolving, with the potential risk which may not be ignored.

To attempt to mitigate against these difficulties it has already been proposed to de-automate the responses from the various airborne responders by providing each one with a random opening electronic gate which permits or inhibits the transmission of a response to an interrogation in accordance with a random function. The operation of such a gate reduces the number of signals received on the ground practically in half. Moreover, even if in the case of heavy traffic such a system is able to facilitate the identification of aircraft or utilization of other information, it does not permit full advantage to be taken of the technical capacity of the receiver on the ground, especially when traffic is light. Besides, adopting such an arrangement would require the conversion of all aircraft responders which would involve enormous expenditures.

The invention is based on the observation that the responders equipping aircraft furnish responses not only when the receivers with which they are associated receive interrogations whose two characteristic pulses are separated by a nominal time interval corresponding to an interrogation mode, but also when they receive pulse pairs separated by time intervals deviating from the nominal value. When the deviation from the nominal value increases, rates of response less than 100% result. The rates of response diminish until the deviation reach limit values to either side of the nominal value, beyond which no responses are furnished.

The invention is based precisely on this observation which reflects the inevitable limitations of a technological nature and gave rise to a method considerably improving the operation of secondary radar transmission systems between airborne responders and ground receivers.

The invention contemplates no modifications in airborne responders, but rather, varying at will upon transmission of the radar interrogation the time interval between two consecutive pulses characteristic of the interrogating mode, in order to, where appropriate, cause the responders to give responses only to a proportion of interrogations corresponding to the best possible utilization, at each moment, of responses from the various aircraft reaching the airfield receiver.

As long as garbling and fruit are not troublesome the interval between two consecutive pulses remains at the nominal value for which the responder furnishes a response to each interrogation received. From the signals received by the airfield receiver are then derived the requisite information at maximum speed.

As soon as garbling and/or fruit become troublesome the time interval between two consecutive pulses of a pair transmitted by the secondary radar is altered, the quantitative change in the time interval being varied in accordance with the amount of garbling or fruit.

The amount of signals received at the airfield from each or some of the airborne responders in a predetermined period is then smaller than if the interrogation pulses where at their nominal spacing, thereby reducing the overlapping of signals received and facilitating their utilization.

Secondarily, advantage is taken here of the peculiarities of the diverse airborne responders which cause the rate of signals emitted to vary differently depending on the time interval between the pulses of a pulse pair.

If, after a decrease in the number of aircraft in a predetermined azimuthal zone, or changes of position of the aircraft relative to one another, garbling becomes less troublesome, the secondary radar transmitted is once again adjusted so that the interval between two consecutive pulses which are characteristics of the interrogating mode is closer or equal to the nominal value; the system thus constantly operates at its maximum operating efficiency. Such an adjustment may either be continuous or intermittent at predetermined intervals. It may be manual or automatic.

The invention provides a variation in the time interval between two consecutive pulses of a pulse pair, characteristic of an operating mode, in correlation with the degree of air congestion of an azimuthal zone.

In the description which follows, given by way of example, reference is made to the accompanying drawings, in which.

Figure 1:
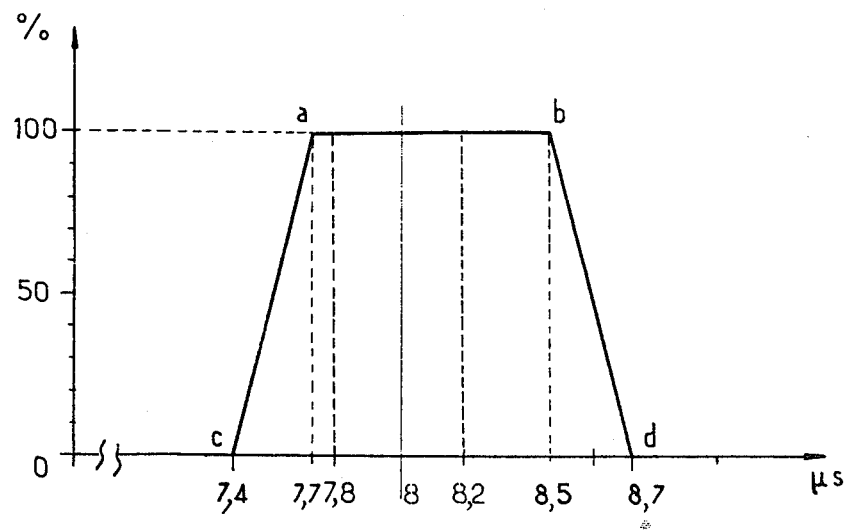
FIG. 1 is a graphic representation of the rate of response of a first type of responder as a function of the time interval between the pulse pair of an interrogation signal.

The graphic representation of FIG. 1 shows the response curve of an airborne responder complying with present-day regulations for mode A operation to the transmission of interrogation signals from a ground-based secondary radar station at an airport or airfield, the interrogation signals consisting of repeated pulse pairs the two pulses of a pair being separated by an 8 $\mu$s time interval.

The horizontal line segment ab along the 100% marking on the ordinate axis indicates the fact that the responder furnishes 100% of the responses in case the interrogations received from the airfield radar consist of a pair of pulses not only those spaced from 8 $\mu$s, which is the nominal value, but also those the time spacing of which deviates from this value by, at most approximately 0.3 $\mu$s below the nominal value and at most approximately 0.5 $\mu$s above the nominal value. Such a responder complies with the regulations as it provides a 100% response rate to interrogations the pulses of which are separated by a time interval T comprised between 7.8 $\mu$s and 8.2 $\mu$s.

Line segment ac indicates the fact that the responder furnishes a decreasing proportion of responses if the interval T between the pulses of a pulse air decreases below 7.7 $\mu$s, up to not furnishing responses for interval values T between consecutive pulses of a pulse pair interval less than approximately 7.4 $\mu$s.

Likewise the responder considered furnishes increasingly fewer responses if the interval T between two pulses of an interrogation pulse pair exceeds approximately 8.5 $\mu$s; it provides no responses for interval values greater than approximately 8.7 $\mu$s, as shown by segment bd of FIG. 1.

Figure 2:
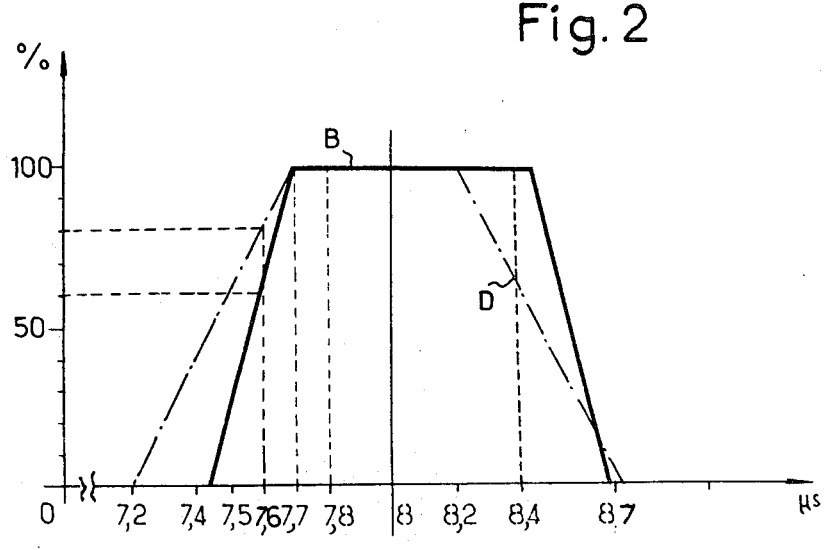
FIG. 2 is a graphic representation similar to FIG. 1 for other types of responders.

Other responders have different characteristics. Curve B of FIG. 2 is a graphic representation relating to a responder providing 100% of responses for interrogation pulse pairs spaced an interval T comprised between 7.7 $\mu$s and 8.4 $\mu$s and which provides increasingly fewer responses for lower and higher values, and no responses for interval values less than about 7.4 $\mu$s and greater than about 8.7 $\mu$s.

Another responder has characteristics shown by graphic representation D. It provides responses to 100% of the interrogations for an interval T between two pulses of a pulse pair whose value is between about 7.7 $\mu$s and about 8.2 $\mu$s. It provides no responses for interval values less than about 7.2 $\mu$s or greater than about 8.7 $\mu$s.

In the illustrated graphs the variations between the rates of response between 100% and 0% are linear. For other responders the variations of the rates of response are not linear.

Figure 3:
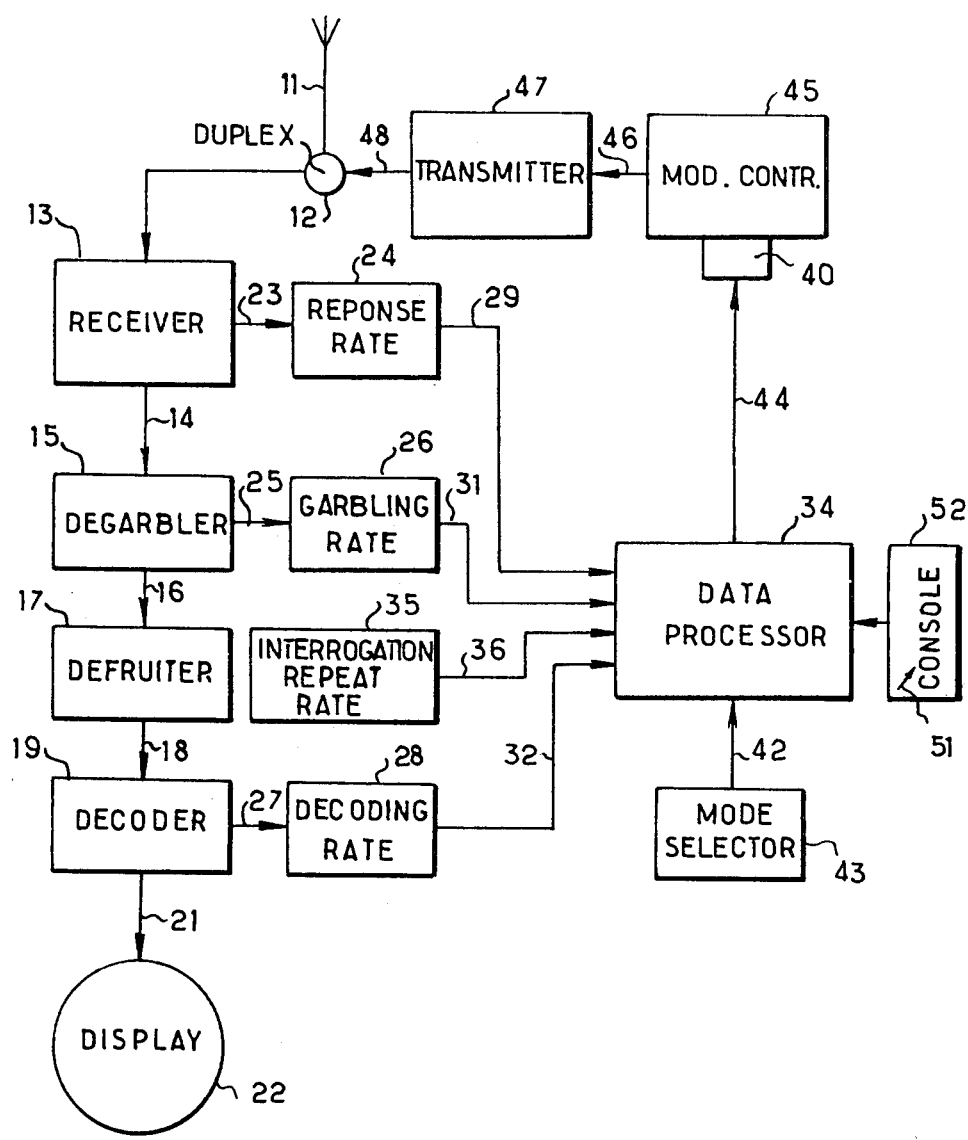
FIG. 3 is a block diagram of a secondary radar system embodying the present invention.

The system comprises a receiving and transmitting antenna 11 (FIG. 3) rotating at uniform angular velocity around a vertical axis, of the conventional type used for secondary radar airfield antennas.

Signals picked up by antenna 11 are carried via a duplexing means 12 to a receiver 13 connected by a circuit 14 to degarbling means 15 which is connected by a circuit 16 to a defruiting means 17. The information at the output 18 of the defruiting means is applied to a decoding means 19 whose outlet is connected by a circuit 21 to display means 22.

A second receiver output is connected by a circuit 23 to a rate of response determining means 24, and likewise a circuit 25 connects the degarbling device 15 to a rate of garbling determining means 26.

The decoding means 19 has a second output connected by a circuit 27 to a rate of decoding determining means 28.

The rate of response, the rate of garbling and the rate of decoding as determined respectively by the determining means 24, 26 and 28 are applied by circuits 29, 31 and 32 respectively to the inputs of a date processing means 34.

A device 35 for controlling the rate of repetition of the interrogations is also connected to the data processing means 34 by a circuit 36. A circuit 42 connects the data processing means 34 to means for introducing an interrogating mode, or mode selector 43.

The output 44 of the data processor 34 is connected to modulation control means 40, associated with a mode modulator 45, the outlet 46 of the mode modulator modulates the transmitter or interrogator 47, connected to the antenna 11 via circuit 48 and the duplexing means 12, for varying the time interval between the pulses of a pulse pair constituting an interrogation. This variation is therefore a function of the output of the data processing means 34.

To operate the system according to a particular mode, e.g. mode A, the mode selector 43 is set for this code.

In the event of light air traffic in the vicinity of the airfield, the transmitted 47 transmits interrogation signals with the time interval at the nominal value of the A mode, i.e. pairs of pulses time spaced 8 $\mu$s between each other. The airborne responder or responders receive the interrogation signals and transmit a response to each pair of interrogation pulses received. If, taking into account the overall receiving characteristics, for example, owing to the fact of the increase in air traffic, or even the presence of several aircraft in the same azimuthal zone, the rate of responses becomes too high and/or the degarbling is no longer accomplished satisfactorily, bearing in mind the rate of repetition of the interrogations (and/or if the decoding rate falls too low) then the data applied to the data processing means 34 by circuits 29, 31 and 32 provides at the output 44 of the data processing means 34 a signal which by means of the modulation control means 40 causes the value of the interval T between the consecutive pulses of interrogation signals to decrease or increase relative to the nominal value of 8 $\mu$s.

If, for example, the value of the interval T becomes 7.6 µs an aircraft responder which has characteristic response curve B provides a response rate of 60% whereas an aircraft responder having a characteristic response curve D provides a response rate of 80%.

The number of responses received at the airfield during a predetermined time period decreases and the overlapping of responses is diminished, the identification numbers and/or flight pattern of each aircraft is thus determined quicker and more reliably.

Data input to the data processing means 34 is, advantageously, controlled so that the system is constantly operating under optimum conditions of reception with regard to the identification of aircraft or the recognition of their flight patterns.

The system may also operate according to another mode, for example mode C, by adjusting the mode selector 43, or successively to mode A and mode C, for example, with a view to determining at any time both the identity of various aircraft and their altitude.

According to another embodiment, the selection of the length of time T separating two consecutive pulses of a pulse pair constituting an interrogation signal is produced by means of a manual control means 51 provided on a console 52 and connected to the data processor 34.

The operator then makes the adjustment of identification and garbling conditions as a function of traffic displayed on the radar screen.

I claim:

1. A method for the improved utilization of response signals transmitted by receivers aboard aircraft in the vicinity of a ground-based secondary radar station transmitting interrogating signals consisting of time-spaced pulse pairs, the time interval T between the pulses of a pair being characteristic of the interrogation, the airborne receivers being of the type providing response signals to all interrogation signals have a time interval T comprised in a nominal time interval, response signals to a percentage of interrogation signals for ranges of time intervals T greater and/or lesser than the nominal time interval and no responses to interrogation signals having time intervals beyond predetermined limits,
   the improvement comprising varying the time interval T between the pulses of an interrogation signal as a function of the number of response signals and/or the time relationship of the response signals received at the ground-based radar station from the airborne responders so as to improve the overall reception decoding of response signals in accordance with air traffic conditions by taking advantage of variations in the response signal rate as a result of variations of the time interval T.

2. Method according to claim 1, comprising varying the time interval T as a function of the response rate of response signals received at the ground-based radar station.

3. Method according to claim 1, comprising varying the time interval T as a function of the overlapping or garbling of responses received at the ground-based radar station.

4. A method according to claim 1, comprising varying the time interval T as a function of rate of decoding response signals at the ground-based radar station.

5. In a secondary radar system including a ground-based radar station having interrogator means for transmitting interrogation signals consisting of time-spaced pulse pairs, the time interval T between pulses of a pair being characteristic of the interrogation, a transponder means aboard aircraft, said transponder means being of the type providing response signals to all interrogation signals having a time interval T comprises in a nominal time interval, response signals to a percentage of interrogation signals for ranges of time interval T greater and/or lesser than the nominal time interval, and no responses to interrogation signals having time interval T beyond predetermined limits, said station having a receiver means for receiving said response signals,
   the improvement comprising means for varying the time interval T between the pulses of an interrogation signals as a function of the number of response signals and/or the time relationship of the response signals received at the ground-based radar station so as to improve reception decoding of response signals in accordance with air traffic conditions in azimuthal zones.

6. System according to claim 5, wherein said means for varying the time interval T comprises modulation control means of said interrogator means.

7. System according to claim 6, further comprising multi-input data processing means, said modulation control means being connected to an output of said date processing means.

8. System according to claim 7, further comprising means connected to one of the inputs of said data processing means for determining the response rate to interrogation signals.

9. System according to claim 7, said receiver means including degarbling means, and means for determining the garbling rate of response signals connected between said degarbling means and an input of said data processing means.

10. System according to claim 7, said receiver means including decoding means, and means for determining the decoding rate of response signals connected between said decoding means and an input of said date processing means.

11. System according to claim 7, further comprising means for controlling the rate of repetition of interrogations connected to an input of said data processing means.

12. System according to claim 7, further comprising an interrogation mode selector connected to an input of said date processing means.

13. System according to claim 6, including operable means connected to said data processing means for manually varying the time interval as a function of a traffic conditions displayed on display means associated with said receiver means.

* * * * *

UNITED STATES PATENT AND TRADEMARK OFFICE
CERTIFICATE OF CORRECTION

PATENT NO. : 4,174,519
DATED : November 13, 1979
INVENTOR(S) : Pierre R. Poli

It is certified that error appears in the above-identified patent and that said Letters Patent are hereby corrected as shown below:

Col. 2, line 58, change "where" to --were--.

Col. 3, line 2, change "characteristics" to --characteristic--.

In the Claims:

Col. 6, line 13, change "comprises" to --comprised--.

Signed and Sealed this

Eighteenth Day of March 1980

[SEAL]

Attest:

SIDNEY A. DIAMOND

Attesting Officer

Commissioner of Patents and Trademarks

UNITED STATES PATENT AND TRADEMARK OFFICE
CERTIFICATE OF CORRECTION

PATENT NO. : 4,174,519
DATED : November 13, 1979
INVENTOR(S) : Pierre R. Poli

It is certified that error appears in the above—identified patent and that said Letters Patent is hereby corrected as shown below:

Col. 6, Claim 5, line 21, after "pulses of" delete --an--.

Signed and Sealed this

Twenty-second Day of July 1980

[SEAL]

Attest:

SIDNEY A. DIAMOND

Attesting Officer     Commissioner of Patents and Trademarks